Figure 1:
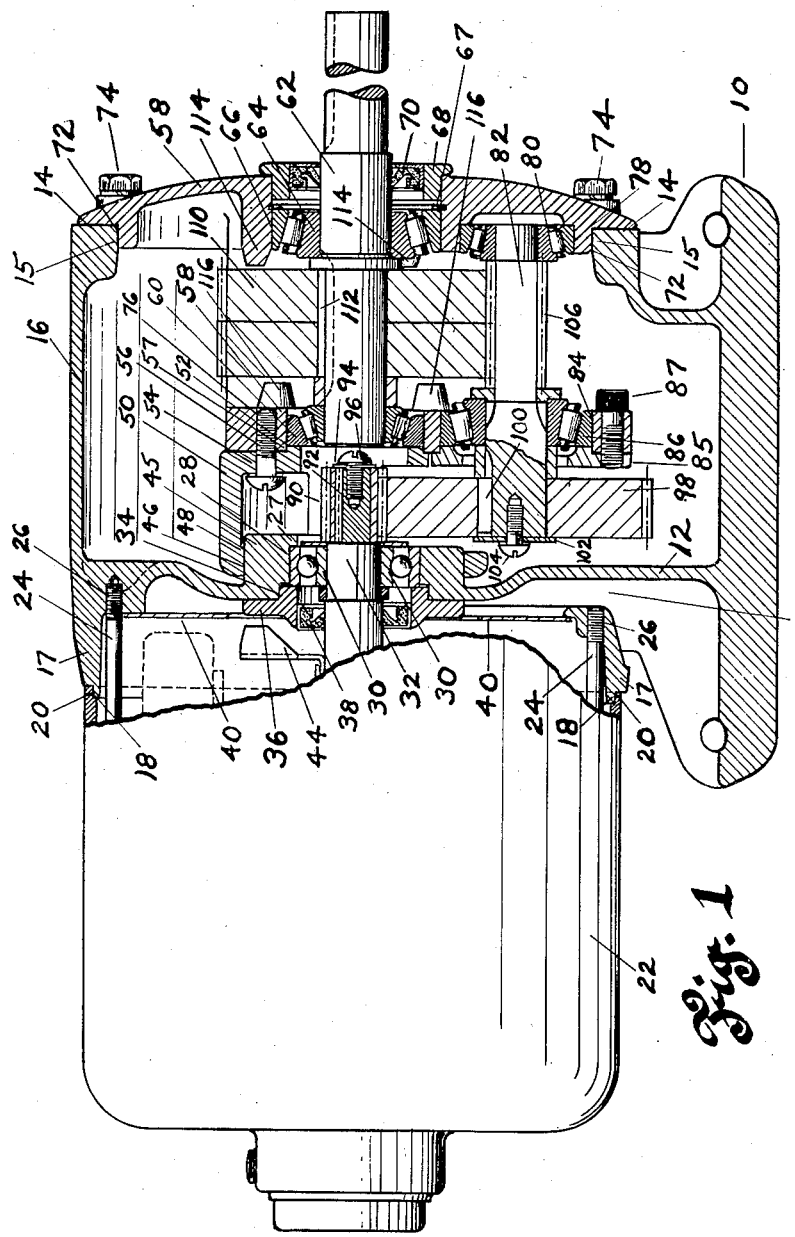

Dec. 11, 1951  C. O'DANIEL  2,578,446
GEARED ELECTRIC MOTOR

Filed Oct. 2, 1946  3 Sheets-Sheet 2

INVENTOR:
CLARENCE O'DANIEL
BY
Roy M. Eilers
ATTORNEYS.

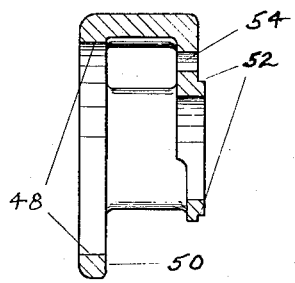
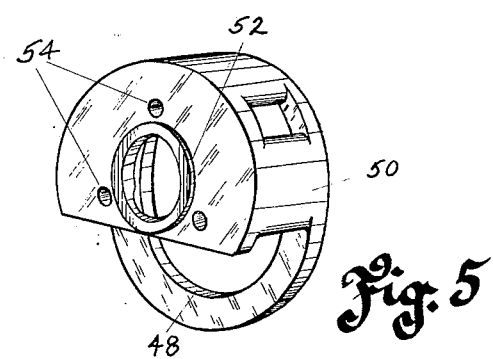
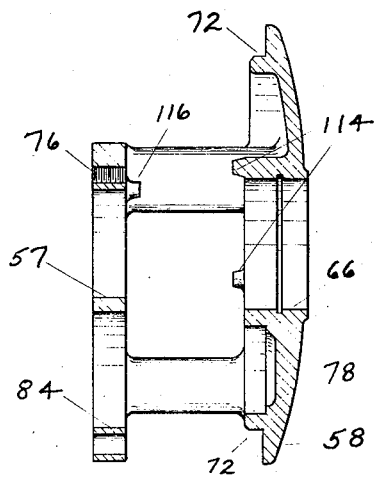
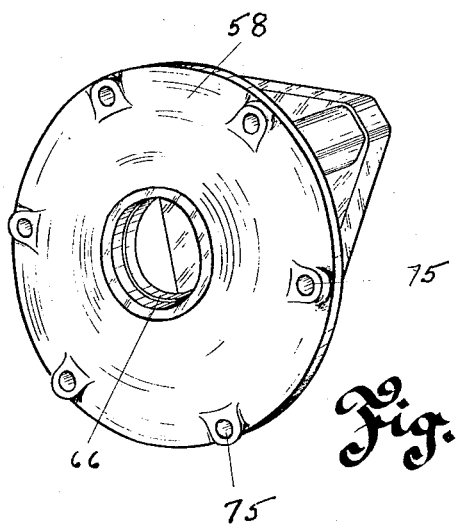

Patented Dec. 11, 1951

2,578,446

UNITED STATES PATENT OFFICE 2,578,446

GEARED ELECTRIC MOTOR

Clarence O'Daniel, Richmond Heights, Mo., assignor to Century Electric Company, a corporation of Missouri Application October 2, 1946, Serial No. 700,765

5 Claims. (Cl. 74—421.5)

This invention relates to improvements in dynamoelectric machines. More particularly, this invention relates to improvements in methods and apparatus for mounting gear trains or other rotative equipment in precise alignment with the shafts of dynamoelectric machines.

It is, therefore, an object of the present invention to provide an improved method and apparatus for mounting gear trains or other rotative equipment in precise alignment with the shafts of dynamoelectric machines.

Where dynamoelectric machines are directly coupled to gear trains or other rotative equipment, it is exceedingly important that the gear trains or other rotative equipment be installed and positioned relative to the dynamoelectric machines in such a way that the couplings between the dynamoelectric machines and the gear trains or other rotative equipment can be operated with a minimum of friction and a minimum of resistance to rotation. In some instances, manufacturers of dynamoelectric machines have used flexible couplings to connect the dynamoelectric machines with the gear trains or other rotative equipment and have expected the flexible couplings to account for, and to compensate for, the fact that the mating shafts of the dynamoelectric machines and the gear trains or other rotative equipment are not precisely aligned. In other instances, manufacturers of dynamoelectric machines have supported the gear trains or other rotative equipment on resilient supports, expecting the resilient supports to compensate for the fact that the mating shafts of the dynamoelectric machines and the gear trains or other rotative equipment are not precisely aligned. Such constructions are artifices at best and they cannot prevent friction and wear due to angulation of the shafts of the dynamoelectric machines relative to the mating shafts of the gear trains or other rotative equipment. In still other instances, manufacturers of dynamoelectric machines have thought of providing a one piece casting that could support and carry the gear train or other rotative equipment and could bear against and be partially supported by the end bracket of the dynamoelectric machine. Such a construction could be more desirable than constructions which rely on the use of flexible couplings or rely on the use of resilient mounting of the gear train or other rotative equipment; but all known constructions of this type have been found to be unsatisfactory because although they can guarantee that the gear train or other rotative equipment is held fixedly, relative to the dynamoelectric machine, they do not and cannot guarantee that the mating shafts of the dynamoelectric machine and the gear train or other rotative equipment will be precisely aligned. For these various reasons, presently known methods and apparatus for coupling dynamoelectric machines with gear trains or other rotative equipment are objectionable. The present invention obviates these objections by providing improved supporting frames for dynamoelectric machines and the gear trains or other rotative equipment coupled thereto, which frames have all of the critical surfaces of each of the elements thereof machined at the same "set up," thus providing a precisely aligned fit between the elements of the frames and also providing concomitant precisely aligned coupling of the dynamoelectric machines with the gear trains or other rotative equipment. It is, therefore, an object of the present invention to provide an improved supporting frame for gear trains or other rotative equipment wherein each of the critical surfaces of the elements of the frame are machined at the same "set up."

In the present invention, the gear train or other rotative equipment is supported by a frame that includes the end bracket of the dynamoelectric machine and two other brackets that both bear against and are supported by the end bracket of the dynamoelectric machine. The end bracket of the dynamoelectric machine has three critical surfaces, namely, the surface that receives the bearing which supports one end of the shaft of the dynamoelectric machine, the surface that supports the first of the other two brackets of the frame, and the surface that supports the second of the other two brackets of the frame. By a critical surface is meant a surface which must be so precisely aligned with other surfaces of the dynamoelectric machine housing or the frame for the gear train or other rotative equipment, that the frame and the housing are precisely aligned and the driving and driven shaft can rotate with minimum resistance. In the case of the end bracket, each of the three critical surfaces is machined at one "set up." In other words, the end bracket of the dynamoelectric machine is "set up" in a lathe or other metal working machine and each of the three critical surfaces is machined before the end bracket is removed from that lathe. In this way, the critical surfaces can all be made precisely concentric and precisely coaxial. The end bracket has another surface that must be machined carefully although it is not a critical surface, and that is the surface which receives and supports the housing of the dynamoelectric machine. This particular surface can be advantageously machined before the end bracket is "set up" in the lathe and as a matter of fact, that particular surface can be used to locate the end bracket relative to the jig which is carried by the face plate of the lathe and is used to support the bracket while its three critical surfaces are being machined. The first of the other two brackets of the frame has two critical surfaces, namely, the surface that engages the end bracket of the dynamoelectric machine and the surface that engages the second of the other two brackets of the frame. Each of these surfaces is machined at one "set up" and thus they will be precisely concentric and coaxial. The second of the other two brackets of the frame also has three critical surfaces; one of those surfaces bears against the end bracket of the dynamoelectric machine, another bears against the first of the other two brackets of the frame and supports one end of the driven shaft, and the third supports the other end of the driven shaft. In addition, the second of the other two brackets has two surfaces, spaced from the critical surfaces, that must be carefully machined, and these other two surfaces support the ends of another shaft of the gear train or other rotative equipment. The critical surfaces of the second of the other two brackets are machined at the same "set up," and then those surfaces can be used to center the bracket while the other surfaces are machined. With such a supporting frame, the axis of the shaft of the dynamoelectric machine will be precisely coaxial with or precisely parallel to the axes of the shafts of the gear train or other rotative equipment. Such a construction eliminates all undesired angularity between the mating shafts and reduces frictional resistance and wear to a minimum. It is, therefore, an object of the present invention to provide a supporting frame that has a number of individual brackets, the critical surfaces of each of which are machined at the same "set up."

Each of the critical surfaces of the three brackets of the present invention is a complete circle and as a result those surfaces can be machined with great accuracy and precision. Consequently, the supporting frame of the present invention is considerably more desirable than are supporting frames which have machined surfaces that are not complete circles because incomplete circles cannot be machined with great accuracy. In machining metal, the cutting tool will bend as it cuts and it will take a progressively deeper cut for the first few moments and will thereafter take the same cut until it reaches the end of its travel. In cutting a complete circle, the tool can cut continuously across the face of the surface and can provide a uniform cut, but in cutting an incomplete circle, the tool will be unable to provide a uniform cut. Instead, the tool will provide one portion of the circle with a radius appreciably different from the radius of the rest of the circle and this fact will prevent attainment of the desired precision and accuracy in machining the frame. This is objectionable and it is obviated by the method of the present invention. It is, therefore, an object of the present invention to provide an improved method of making supporting frames for gear trains or other rotative equipment that provides surfaces with uniform radii.

Various methods and apparatus have been proposed for coupling dynamoelectric machines with gear trains or other rotative equipment and some of those methods and apparatus required three points of support for one or more of the shafts of the dynamoelectric machines, gear trains or other rotative equipment. In at least one instance, three points of support have been suggested for the shaft that serves as the coupling link between the dynamoelectric machine and the gear train or other rotative equipment evidently in the belief that the three points of support would maintain the alignment of the mating shafts of the dynamoelectric machine and the gear train or other rotative equipment. As a matter of actual practice however, three points of support for the coupling shaft do not prevent misalignment of the gear train or other rotative equipment relative to the dynamoelectric machine, but instead cause bending of the coupling shaft and cause increases in the frictional losses in both the dynamoelectric machine and the gear train or other rotative equipment. This is objectionable and should be avoided. The present invention obviates this objection by providing a supporting frame which provides just two points of support for each shaft and still maintains each of the shafts in precisely aligned relation. It is, therefore, an object of the present invention to provide a supporting frame that provides just two points of support for each shaft and still maintains each of the shafts in precisely aligned relation.

It is advantageous to provide anti-friction bearings for the shafts of the dynamoelectric machines and the gear trains or other rotative equipment since those bearings decrease frictional losses. However, the use of such bearings makes it necessary to provide clamping or retaining members that will hold the outer races of the bearings in place and those clamping members do add to the cost of the dynamoelectric machines and the gear trains or other rotative equipment. By use of the present invention it is possible to eliminate at least one clamping means, since the first of the other two brackets of the supporting frame also serves as a clamping means for two of the anti-friction bearings of the frame. This not only decreases the cost of the parts going into the frame, but it also decreases the labor involved in assembling the dynamoelectric machine. It is, therefore, an object of the present invention to provide a supporting frame wherein one of the brackets serves as a clamping means for two of the anti-friction bearings of the frame.

Other objects and advantages of the present invention should become apparent from an examination of the drawing and accompanying description.

In the drawing and accompanying description, a preferred embodiment of the present invention is shown and described but it is to be understood that the drawing and accompanying description are for the purposes of illustration only and do not limit the invention and that the invention will be defined by the appended claims.

Figure 2:
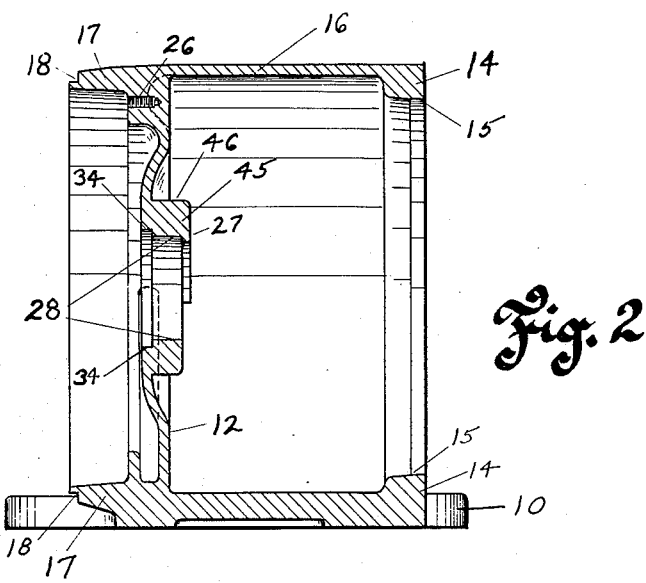
Figure 3:
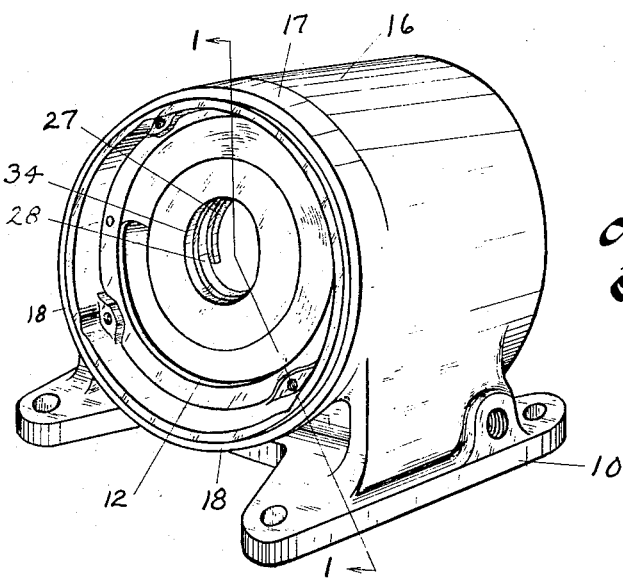

In the drawing, Fig. 1 is a partially sectioned, side elevational view of a dynamoelectric machine coupled directly to a gear train, and it is taken along the planes indicated by the line 1—1 of Fig. 3, Fig 2 is a cross sectional view through the side of the end bracket of the dynamoelectric machine of Fig. 1, Fig. 3 is a perspective view of the end bracket of Fig. 2, Fig. 4 is a cross sectional view through the side of one of the brackets of the supporting frame shown in Fig. 1, Fig. 5 is a perspective view of the bracket shown in Fig. 4, Fig. 6 is a cross sectional view through the side of another bracket of the supporting frame shown in Fig. 1, and Fig. 7 is a perspective of the bracket shown in Fig. 6.

Referring to the drawing in detail, the number 10 denotes the base of the end bracket of the dynamoelectric machine of Fig. 1. Secured to and extending upwardly from the base 10 is a cylindrical housing 16 which has a partition or wall 12 at the left hand end thereof and has a generally annular rim 14 at the right hand end thereof. The end bracket that includes the housing 16, partition 12, rim 14 and base 10 is shown as a solid piece and it is preferably made by casting, but it can also be made by fabrication. Projecting from the left hand end of the cylindrical housing 16 of the end bracket is an annular section 17 which has integrally formed thereon a machined shoulder 18 of annular form and the shoulder 18 receives the machined surface 20 of annular form on the dynamoelectric machine housing 22. The dynamoelectric machine housing 22 is held in position relative to the end bracket of the dynamoelectric machine by means of bolts 24 that extend through the housing 22 and seat in threaded openings 26 carried by the annular section 17 of the end bracket.

Adjacent the center of the partition or wall 12 is an opening that is intended to receive an anti-friction bearing 30 which supports the right hand end of shaft 32 of the dynamoelectric machine. The anti-friction bearing 30 is supported by a critically machined surface adjacent the right hand face of the partition or wall 12 and this surface is denoted by the numeral 28. Formed at the right hand edge of the surface 28 is a retaining lip 27 that keeps the anti-friction bearing 30 from shifting to the right. As indicated in the drawing, the lip 27 is not completely annular. This provides ample clearance for the rotating gears of the gear train, but still permits the lip 27 to hold the bearing 30 in place. The lip 27 will have a varying height because of the bending of the machining tool, but such a variation will not be objectionable since the lip 27 does not center any of the shafts. The surface 28, which does center the shaft 32, is completely circular and will be provided with a uniform depth of cut by an offset tool that will extend beyond the lip 27. Adjacent the left hand face of the partition 12, and being concentric with the surface 28, is a surface 34 of somewhat larger radius that receives a supporting plate 36 of annular form. The plate 36 carries an oil seal 38, and it acts to maintain that seal in engagement with the shaft 32 at the same time it acts to hold the bearing 30 in place against the retaining lip 27. The outer periphery of the supporting plate 36 is spaced inwardly from the inner periphery of a baffle plate 40 that is secured to and supported by the end bracket of the dynamoelectric machine and the gap between the outer periphery of supporting plate 36 and the inner periphery of the baffle plate 40 permits air from the inlet 42 to pass to the rotatable air-moving means 44 that is mounted on and rotatable with the shaft 32. The air from the air-moving means 44 will be directed toward the left hand end of the dynamoelectric machine housing 22 and it will pass by and cool the stator and rotor of the dynamoelectric machine as it moves through the housing 22.

Formed on the right hand face of partition or wall 12 is a hub 45 of annular form and this hub has an externally machined surface 46 thereon. The surface 46 is concentric with the interiorly machined surface 28 and the exteriorly machined shoulder 18; in addition, the exteriorly machined surface 46 is concentric with the interiorly machined surface 15 of rim 14. The surfaces 46, 28 and 15 are machined during the same "set up" of the end bracket and the surface 18 is preferably machined prior to the time the bracket is "set up" in the metal working machine. Where the surface 18 is machined prior to the time the end bracket is set up in the metal working machine, the surface 18 can be used to locate the bracket in the jig that secures the bracket to the metal working machine. In this way, each and every one of the surfaces 46, 28, 15 and 18 can be made precisely coaxial. It will further be noted that each of the surfaces 46, 28, 15 and 18 are complete circles, thus permitting the attainment of a uniform depth of cut for those surfaces in the machining process.

Formed to closely engage and be supported by the externally machined surface 46 is an internally machined surface 48 on the intermediate bracket 50. The bracket 50 has an externally machined surface 52 at the right hand end thereof and the internally machined surface 48 and the externally machined surface 52 are machined at the same "set up" of the bracket 50. The external surface is machined with the usual form of cutting tool but the internal surface 48 is machined with an offset tool. In this way, surfaces 48 and 52 are made precisely coaxial. Moreover, the surfaces 48 and 52 are completely circular and thus can be given a uniform depth of cut.

The surface 48 is machined in such a way that it provides a virtual "press fit" with the externally-machined surface 46 on the hub 45 of partition 12 and this "press fit" prevents shifting or movement of the intermediate bracket 50 relative to the partion 12. In addition, the "press fit" cooperates with the precise machining of the surfaces 46 and 48 to maintain the surface 52 of bracket 50 in precise alignment with surface 28 of the partition 12 of the end bracket. A number of openings 54 are provided in the right hand face of bracket 50 and these openings receive bolts 56 that seat in openings 76 in the bracket 58. The right hand end of the bracket 50, and a portion of the body of the bracket 50, is cut away along a horizontal plane but the left hand end of the bracket 50 provides a complete circle on which the machined surface 48 is formed.

Machined to engage and be supported by the externally machined surface 52 of bracket 50 is an internally machined surface 57 on the left hand end of gear supporting bracket 58. The internally machined surface 57 not only receives the externally machined surface 52 of bracket 50 but it also receives the anti-friction bearing 60 that supports the left hand end of the driven shaft 62. The right hand end of the shaft 62 is supported in an anti-friction bearing 64 that is supported by the internally machined surface 66 of the gear supporting bracket 58. The internally machined surface 66 of the gear supporting bracket 58 not only supports the anti-friction bearing 64 but it also supports the annular plate 68 which carries the oil seal 70 that bears against the shaft 62. An annular retaining ring 67 is provided to limit movement of the bearing 64 to the right, and this retaining ring 67 cooperates with the machined surface 52 on intermediate bracket 50 to hold bearings 60 and 64 against displacement. Thus it is apparent that the intermediate bracket 50 not only serves to maintain the gear supporting bracket 58 in precise alignment with the end bracket, but it also serves to clamp the anti-friction bearings 60 and 64 in position.

Spaced outwardly from the internally machined surface 66 of gear supporting bracket 58 is an externally machined surface 72 that engages and is supported by the surface 15 on the rim 14 of the end bracket of the dynamoelectric machine. The bracket 58 is secured to the end bracket of the dynamoelectric machine by bolts 74 that extend through openings 75 and are seated in the rim 14; the bracket 58 is secured to the intermediate bracket 50 by the bolts 56 that seat in the openings 76 in the left hand end of the bracket 58.

Formed in the lower half of the gear supporting bracket 58 is a supporting surface 78 that supports and carries the anti-friction bearing 80, which bearing in turn supports the right hand end of the shaft 82. Spaced horizontally from the internally machined surface 78 is a second internally machined surface 84 which carries and supports the anti-friction bearing 86 and the bearing 86 supports the left hand end of the shaft 82. The supporting surfaces 72, 66 and 57 are all machined at the same "set up" of the bracket 58 and thus they are precisely coaxial. The supporting surfaces 78 and 84 are machined at a later time and in a separate "set up" of the gear supporting bracket 58 but they are precisely located and machined relative to surfaces 57, 66 and 72 since the bracket 58 is located exactly in a jig by the engagement between the jig and the surface 72. By making the jig with the precision of which tool makers are capable, it is possible to eliminate errors by the lathe operator and to make the surfaces 78 and 84 exactly parallel with the axes of surfaces 57, 66 and 72. It will be noted that each of the surfaces 72, 66, 78, 84 and 57 is completely circular and thus each of them can be given a uniform depth of cut. In addition, the surfaces 57 and 72 are machined so they provide a "press fit" with the surface 52 of gear supporting bracket 50 and the surface 15 of the end bracket, respectively. The "press fit" between surfaces 52 and 57 precisely aligns the surfaces 72 and 48 and the "press fit" between surface 15 and surface 72 cooperates with the "press fit" between surfaces 48 and 46 to place each of the surfaces of gear supporting bracket 58 in parallel with the surface 28 of the end bracket.

The internally machined surface 20 on the dynamoelectric machine housing 22 is made coaxial with the surface that is at the left hand end of the housing 22 and supports the bearing for the left hand end of the shaft 32. When, therefore, the surface 20 is pressed onto the shoulder 18, which is coaxial with surface 28, the two bearings for the shaft 32 are not only made precisely coaxial with each other but are made precisely parallel with the axes of each and every one of the surfaces 18, 20, 46, 48, 52, 57, 66, 72 and 15. Moreover, they will be very closely, if not precisely parallel to the surfaces 78 and 84.

In this way, precise alignment of each of the shafts of the gear train relative to the shaft 32 of the dynamoelectric machine is obtained. This alignment is provided by the precise machining of the surfaces and by the "press fits" between those surfaces. As a matter of actual practice, the "press fits" between the various surfaces can hold the bracket 50 tightly assembled with partition 12 of the end bracket, can hold the bracket 50 tightly assembled with bracket 58, and can also hold the bracket 58 tightly assembled with the end bracket. But, to prevent shifting of the brackets under continued applications of force, the bolts 56 and 74 are used as shown in Fig. 1.

A pinion 90 is mounted on the right hand end of the shaft 32, and it is held in assembled relation with the shaft 32 by means of a key 92, a washer 94 and a screw 96. The pinion 90 meshes with a larger diameter gear 98 which is mounted on the left hand end of the shaft 82 and is secured to the shaft 82 by the key 100, the washer 102 and the screw 104. The gear 98 is so dimensioned that it will not strike the retaining lip 27 of the partition 12 but will mesh with the pinion 90. Mounted on the right hand end of the shaft 82 is a pinion 106 which is secured to the shaft 82 by a key, not shown. Meshing with the pinion gear 106 is a larger diameter gear 110 that is mounted on the right hand end of the shaft 62 and is secured to the shaft 62 by the key 112. The gear 110 is dimensioned so it will rotate freely and will not strike the projections 114 and 116 that are provided on the gear supporting bracket 58 and serve to keep the gear 110 from getting into such a position relative to the gear supporting bracket 58 that its teeth would be injured during the insertion or withdrawal of the shaft 62. In the absence of the projections 114 and 116, the gear 110 might tilt and the teeth of that gear might be pressed against the left hand or right hand end of gear supporting bracket 58 with sufficient force to cause serious injury to the teeth.

A bearing retaining plate 85 is provided that will fit into the machined surface 84 and bear against the bearing 86. This plate, like the surface 52 of bracket 50, holds a shaft against displacement. In this instance, the plate 85 bears against bearing 86 and holds the shaft 82 in position. Where desired, shims may be inserted between the edges of the bearings 60 and 86 and the surface 52 and the plate 85 respectively and these shims will provide the required pressure on the edges of the bearings. Three bolts 87, one of which is shown, extend through the bracket 58 and secure the plate 85 to the bracket 58.

In assembling the structure shown in the drawing, the anti-friction bearings 60, 64, 80 and 86, and the shafts 82 and 62, and the gears 110, 106 and 98 are assembled with the bracket 58 in the manner shown. Thereafter, the bracket 50 is set so the lower right hand edge thereof is above the top of the gear 98, and the bracket 50 is moved to the right until its right hand end bears against the triangular left hand face of the bracket 58. At such time the right hand wall of the bracket 50 will be in register with the space between the right hand face of the gear 98 and the triangular left hand face of the bracket 58, and thereupon the bracket 50 can be moved downwardly until the externally machine surface 52 is in register with the internally machined surface 59. Translation of the bracket 50 to the right will place the brackets 50 and 58 in precise and accurate alignment and will hold the shaft 62 against displacement. The threaded ends of the screws 56 are then passed through the openings 54 in the right hand wall of the bracket 50 and are threaded into the openings 76 in the triangular left hand end of bracket 58. When these screws 56 are firmly seated, they hold the brackets 50 and 58 together and prevent any shifting or movement of the one bracket relative to the other. Thereafter, the dynamoelectric machine housing 22 is provided with an anti-friction bearing at the left hand end thereof and is also provided with a stator and a rotor. Once this has been done, the end bracket is provided with the anti-friction bearing 30, the oil seal 38, the annular baffle plate 40 and the supporting plate 36 and then the housing 22 is moved toward the end bracket until the right hand end of the shaft 32 extends through and seats in the bearing 30 and until the surface 20 engages and is supported by the shoulder 18. At this time the bearings for the shaft 32 are in precise alignment with each other and with the surface 46 on hub 45 and they are held in that alignment by the "press fit" between surface 20 and shoulder 18 and also by the engagement between bolts 24 and the openings 26 of the end bracket. The pinion 90 is then keyed onto the shaft 32 and is held there by the washer 94 and the screw 96. Once this has been done, the assembled brackets 50 and 58 are set so the bracket 50 is close to the rim 14, pinion 90 is turned to a position where it can mesh with gear 98, and then the assembled brackets 50 and 58 are moved to the left until the surface 48 of bracket 50 engages and is supported by surface 46 and until the surface 72 of bracket 58 engages and is supported by the surface 15. At this time, each of the shafts 62 and 82 will be precisely parallel to the shaft 32 of the dynamoelectric machine. The bolts 74 are then passed through openings 75 and are seated in the rim 14 and these bolts will cooperate with the "press fits" between surfaces 48 and 46 and 72 and 15 to maintain the precise parallelism of shafts 32, 62 and 82.

The provision of a supporting frame which has two critically machined brackets is extremely valuable because those brackets facilitate the assembly of the gears and shafts with the supporting frame. Moreover, the two brackets are easier to handle and they permit the elimination of one of the bearing retaining members.

Because of the precise alignment of the shafts 32, 62 and 82, close tolerances can be maintained between the mating gears 90 and 98 and 106 and 110 and these tolerances cooperate with the parallelism of the shafts 32, 62 and 82 to provide extremely quiet, efficient and long-lived operation of the dynamoelectric machine and the gear train. Frictional losses are reduced to a minimum, binding of the rotating parts is eliminated, and undue pressures on the gears and gear teeth are avoided. This desirable result is also due to the fact that two points, and only two points, of support are provided for each of the shafts.

Whereas, a preferred embodiment of the present invention has been shown and described in the drawing and accompanying description, it should be apparent to those skilled in the art that various changes can be made in the form of an invention without affecting the scope thereof.

What I claim is:

1. A supporting frame for rotative equipment that has spaced surfaces thereon which are precisely aligned and that support bearings for a shaft, bearings supported by said surfaces, a shaft supported by said bearings, a gear mounted on said shaft, and projections that extend toward but are spaced from said gear when said gear is in its normal operating position, said projections being adapted to prevent tilting of said gear whenever said shaft is assembled with or separated from said gear.

2. In a dynamoelectric machine having a rotor shaft and end bracket including a housing with a circular supporting surface at each end thereof, a bearing hub in said housing which has an inner supporting surface and an outer supporting surface, each of said supporting surfaces on said bearing hub being continuously machined surfaces, a bearing within said inner supporting surface on said bearing hub, said bearing supporting one end of the rotor shaft of said dynamoelectric machine, said one end of said shaft extending through and projecting beyond said bearing and bearing hub, and having a gear thereon, said gear being immediately adjacent said bearing, each of said four surfaces being on a common axis, an intermediate bracket for rotative equipment that has two circular surfaces that are coaxial, one of said circular surfaces at one end of the intermediate bracket engaging and being supported by said outer supporting surface of said bearing hub, a separate gear supporting bracket connected to said intermediate bracket and having a circular surface thereon to engage the other circular surface on the intermediate bracket to support the other end thereof, the circular surface of the intermediate bracket that engages and is supported by said outer supporting surface on said bearing hub being a continuously machined surface, other supporting surfaces on said gear supporting bracket having their axes parallel with said first supporting surface on said gear supporting bracket, and rotative equipment including shafting rotatably supported in parallel relation by said supporting surfaces on said gear supporting bracket, said shafts of said rotative equipment having two points of support per shaft, the supports for each shaft of said rotative equipment being in one casting.

3. In a dynamoelectric machine having a rotor shaft, an end bracket including a housing with a circular supporting surface at each end thereof, a bearing hub in said housing which has a plurality of supporting surfaces thereon, each of said supporting surfaces on said bearing hub being continuously machined surfaces, a bearing within one of said supporting surfaces on said bearing hub, said bearing supporting one end of the rotor shaft of said dynamoelectric machine, said one end of said shaft extending through and projecting beyond said bearing and bearing hub, and having a gear thereon, said gear being immediately adjacent said bearing, each of said four surfaces having an axis, said axes of said four surfaces being parallel, an intermediate bracket for rotative equipment that has two circular surfaces, each of said two surfaces on said intermediate bracket having an axis, said axes of said two circular surfaces on said intermediate bracket being parallel, one of said circular surfaces at one end of the intermediate bracket engaging and being supported by said other of supporting surfaces on said bearing hub, a separate gear supporting bracket connected to said intermediate bracket and having a circular surface thereon to engage the other circular surface on the intermediate bracket to support the other end thereof, the circular surface of the intermediate bracket that engages and is supported by the other said supporting surface on said bearing hub being a continuously machined surface, other supporting surfaces on said gear supporting bracket, and rotative equipment rotatably supported in said gear supporting bracket by said other supporting surfaces, the shafts of said rotative equipment having two points of support per shaft, the supports for each shaft of said rotative equipment being in one casting, one of said shafts extending outwardly beyond said gear supporting bracket and carrying a gear thereon, said gear being in register with said intermediate bracket and with the gear on said one end of said rotor shaft.

4. In a dynamoelectric machine having a rotor shaft, an end bracket including a housing with a circular suporting surface at each end thereof, a bearing hub in said housing which has a plurality of supporting surfaces thereon, each of said supporting surfaces on said bearing hub being continuously machined surfaces, a bearing within one of said supporting surfaces on said bearing hub, said bearing supporting one end of the rotor shaft of said dynamoelectric machine, said one end of said shaft extending through and projecting beyond said bearing and bearing hub, and having a gear thereon, said gear being immediately adjacent said bearing, each of said four surfaces having an axis, said axes of said four surfaces being parallel, an intermediate bracket for rotative equipment that has two circular surfaces, each of said two surfaces on said intermediate bracket having an axis, said axes of said two circular surfaces on said intermediate bracket being parallel, one of said circular surfaces at one end of the intermediate bracket engaging and being supported by said other of said supporting surfaces on said bearing hub, a separate gear supporting bracket connected to said intermediate bracket and having a circular surface thereon to engage the other circular surface on the intermediate bracket to support the other end thereof, the circular surface of the intermediate bracket that engages and is supported by the other said supporting surface on said bearing hub being a continuously machined surface, other supporting surfaces on said gear supporting bracket, and rotative equipment including shafting rotatably supported by said other supporting surfaces, said shafts of said rotative equipment having two points of support per shaft, the supports for each shaft of said rotative equipment being in one casting, said intermediate bracket and said gear supporting bracket being dimensioned relative to said housing on said end bracket so said one circular surface at said one end of the intermediate bracket engages the other of said supporting surfaces on said bearing hub before any other portion of said intermediate bracket and said gear supporting bracket engages said end bracket, whereby assembly of said brackets with said end bracket is facilitated.

5. In a dynamoelectric machine having a rotor shaft, an end bracket including a housing with a circular supporting surface at each end thereof a bearing hub in said housing which has a plurality of supporting surfaces thereon, each of said supporting surfaces on said bearing hub being continuously machined surfaces, a bearing within one of said supporting surfaces on said bearing hub, said bearing supporting one end of the rotor shaft of said dynamoelectric machine, said one end of said shaft extending through and projecting beyond said bearing and bearing hub, and having a gear thereon, said gear being immediately adjacent said bearing, each of said four surfaces having an axis, said axes of said four surfaces being parallel, an intermediate bracket for rotative equipment that has two circular surfaces, each of said two surfaces on said intermediate bracket having an axis, said axes of said two circular surfaces on said intermediate bracket being parallel, one of said circular surfaces at one end of the intermediate bracket engaging and being supported by said other of said supporting surfaces on said bearing hub, a separate gear supporting bracket connected to said intermediate bracket and having a circular surface thereon to engage the other circular surface on the intermediate bracket to support the other end thereof, the circular surface of the intermediate bracket that engages and is supported by the other said supporting surface on said bearing hub being a continuously machined surface, other supporting surfaces on said gear supporting bracket, and rotative equipment including shafting rotatably supported in said gear supporting bracket by said other supporting surfaces, said shafts of said rotative equipment having two points of support per shaft, the supports for each shaft of said rotative equipment being in one casting, one of said shafts extending outwardly beyond said gear supporting bracket and carrying a gear thereon, said intermediate bracket having one wall thereof cut away to accommodate said shaft which extends beyond said gear supporting bracket to facilitate assembly of said intermediate bracket with said gear supporting bracket.

CLARENCE O'DANIEL.

REFERENCES CITED

The following references are of record in the file of this patent:

UNITED STATES PATENTS

| Number | Name | Date |
|---|---|---|
| 1,127,312 | Sundh | Feb. 2, 1915 |
| 1,860,703 | Christian | Aug. 9, 1930 |
| 1,821,216 | Heath et al. | Sept. 1, 1931 |
| 1,923,777 | Delaval-Crow | Aug. 22, 1933 |
| 1,971,968 | Schmiter | Aug. 28, 1934 |
| 2,170,548 | Christian | Aug. 22, 1939 |
| 2,261,104 | Birkigt | Nov. 4, 1941 |
| 2,397,910 | Baker et al. | Apr. 9, 1946 |

FOREIGN PATENTS

| Number | Country | Date |
|---|---|---|
| 436,751 | Great Britain | Oct. 17, 1935 |